United States Patent Office

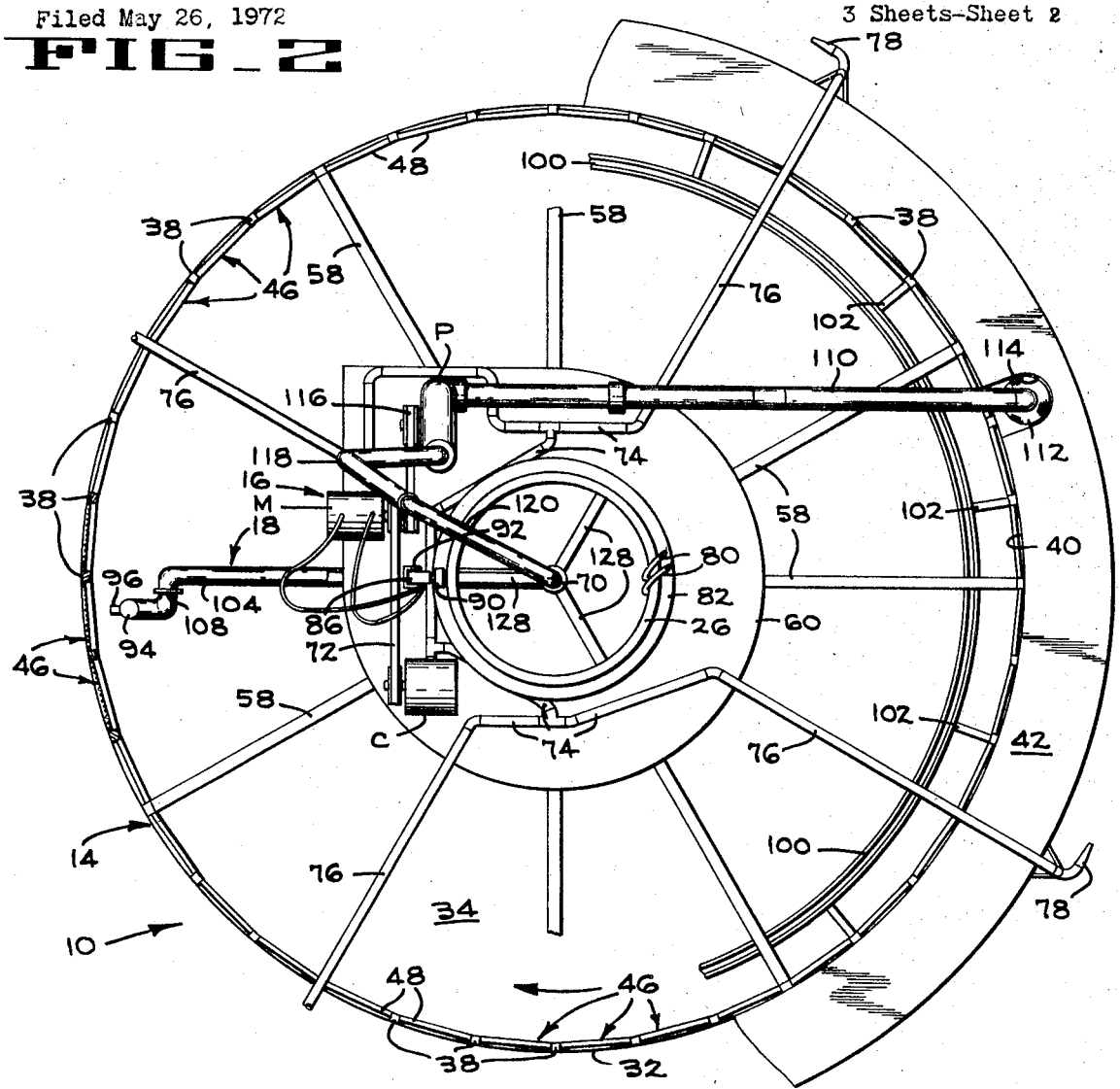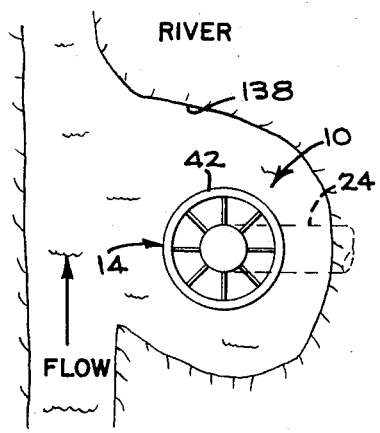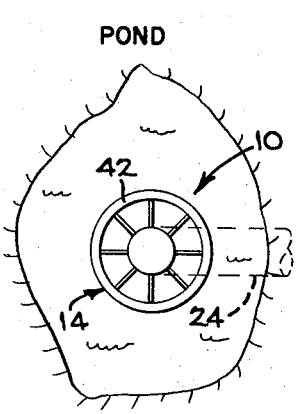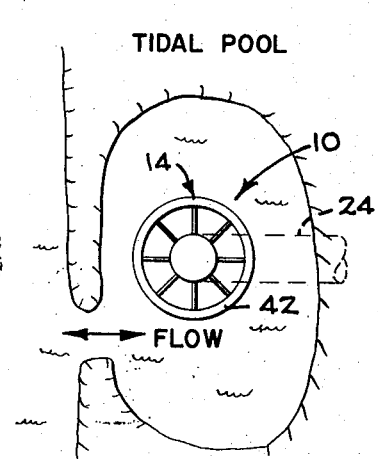

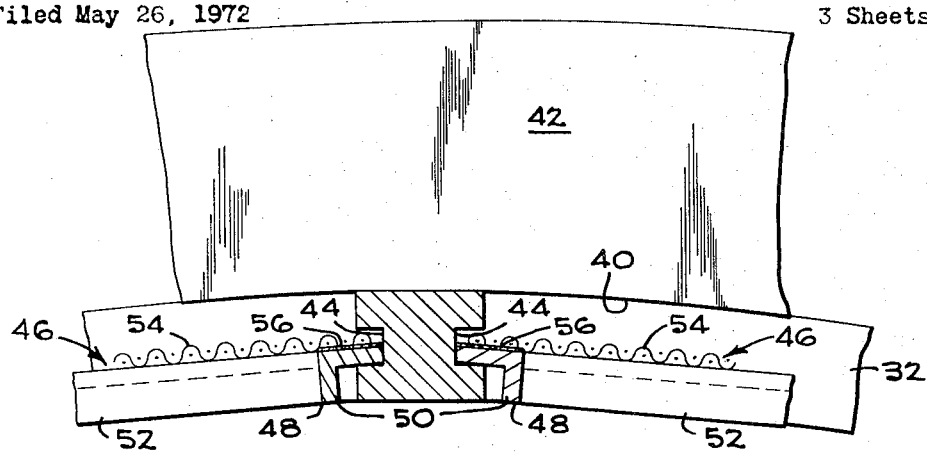
FIG_6
FIG_7
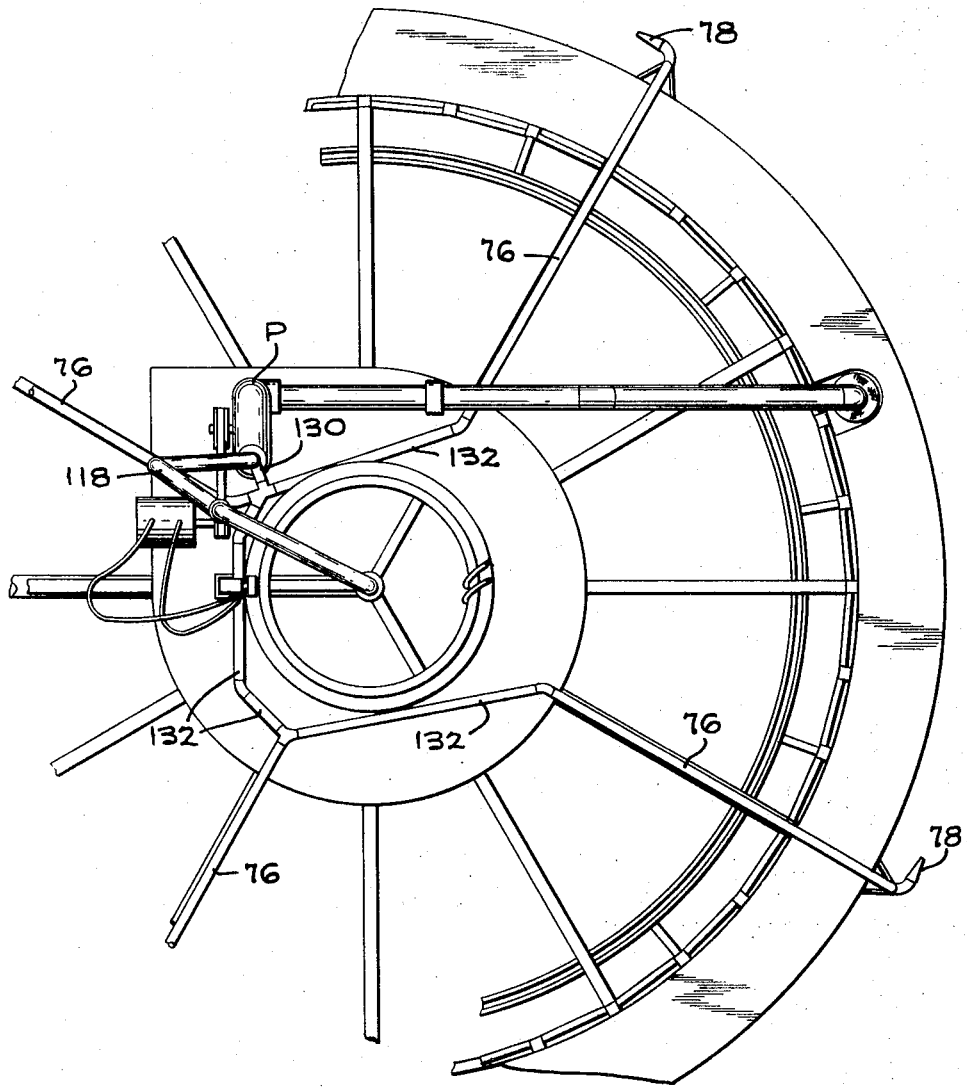

3,843,520
Patented Oct. 22, 1974

3,843,520
FLOATING WATER SCREEN
Robert G. Bottorf, Jenkintown, Pa., assignor to
FMC Corporation, San Jose, Calif.
Filed May 26, 1972, Ser. No. 257,407
Int. Cl. B01d 33/02
U.S. Cl. 210—161                                    11 Claims

ABSTRACT OF THE DISCLOSURE

A floating water screen installation for use in bodies of water in which the level varies comprises an anchoring structure on the bed of such a water body that includes a fixed vertical hollow central column and an outlet pipe in communication with the column. A buoyantly supported generally cylindrical screen structure, having an enclosed bottom, is mounted in a surrounding relationship to the column for vertical sliding motion on the column in response to changes in water level, and for rotation about said column. Long vertical slots are provided in the central column to admit only screened water to the outlet pipe. Rotary drive and screen backwash systems are also described.

BACKGROUND OF THE INVENTION

Field of the Invention

The present invention concerns water screening devices and more particularly to screening devices for employment in bodies of water in which the water level varies.

DESCRIPTION OF THE PRIOR ART

One type of floating water screen presently known in the art simply comprises a buoyant float below which a fully enclosed screen cannister is supported. This floating screen is located within a body of water by means of a tether extending between the screen and a weight on the bottom of the body of water. A flexible outlet line extends from the bottom of the screen through which water may flow by gravity or be pumped to where the water is to be employed.

The practicality of this type of screening device is reduced when it is desired to screen large quantities of water. In addition to tethering, maintenance and cleaning of screens, problems are presented in providing flexible or articulated outlet lines capable of handling large quantities of water.

Another type of known water screen for employment in bodies of water having variable levels, is in the form of a horizontally oriented drum rotatable about its longitudinal axis. The drum is supported for swinging motion in a vertical arc by means of arms pivotally connected between the drum at its longitudinal axis and a rigid support structure such as a bank or dam. The cylindrical drum incorporates flotation chambers in its end wall portions for buoyantly supporting the drum in the body of water. Additionally, a geared drive train extends from the rigid support structure along the swingable support arms to a gear on an exterior end wall portion of the drum to provide rotational motion. Dual outlet pipes extend from the inner portion of the drum, through the end walls, and along the arms to the support structure. The outlet pipe sections include swivel joints to permit vertical swing motion and rotation of the screen drum. Only the cylindrical periphery of the drum extending between dual outlets or suction pipes is employed for screening, and a substantial portion of this screening surface projects above the surface of the water in order to equalize pressure within the interior of the drum when water is pumped out through the outlet lines. A backwash spray is provided to wash debris off the drum screen surface as it is rotated out of the water.

In this type of screening device, an increase in screening area, if low water velocity through the screens is to be maintained, results in a greater inactive screen surface area being projected above water level. Wind loads, due to the projected surface, would increase the structural requirements on both the drum and swinging linkage. The cost of multiple larger diameter swivel joints as well as replacement and maintenance requirements, become significant cost factors.

SUMMARY OF THE INVENTION

One object of the present invention is the provision of a water screen installation for employment in bodies of water in which the water level varies.

A further object is to provide a water screen installation, in accordance with above object, which is capable of screening large quantities of water.

Another object is to provide a floating water screen structure in which the flotation chamber blocks surface debris from impinging against the screen portions without substantially reducing the effective screening area.

A further object of the invention is to provide a simple structure for supporting a floating water screen in a manner to permit the water screen to slide vertically with respect to the support, in response to a changing water level, and to rotate about the support.

Yet another object of the invention is to eliminate the necessity of providing for flexible or articulated screened water outlet lines by providing a central support column which additionally serves as an outlet conduit. The water screen and its support cooperate to provide for continuous and undiminished discharge of screened water throughout the operating range.

Another object of the present invention is the protection and conservation of fish. This is accomplished by the provision of a screening structure with a low velocity water flow through the screen areas to permit fish to swim away and the elimination of pockets and areas in which the fish may be trapped.

Additional objects include the provision of rotating drives which reduce ice formation around the floating screen structure and multiple removable screen panels for simplified maintenance and repair.

The above objects and other advantages of the invention will be pointed out or become evident from the following description, drawings and claims.

BRIEF DESCRIPTION OF THE DRAWINGS

FIG. 2 is a plan view of the floating water screen having portions broken away.

FIGS. 3, 4 and 5 are diagrammatic plan views illustrating employment of the floating water screen in various types of bodies of water.

FIG. 6 is an enlarged section taken on line 6—6 of FIG. 1.

FIG. 7 is a plan view, having portions broken away, of a modified form of the present invention.

DESCRIPTION OF THE PREFERRED EMBODIMENT

Figure 1:
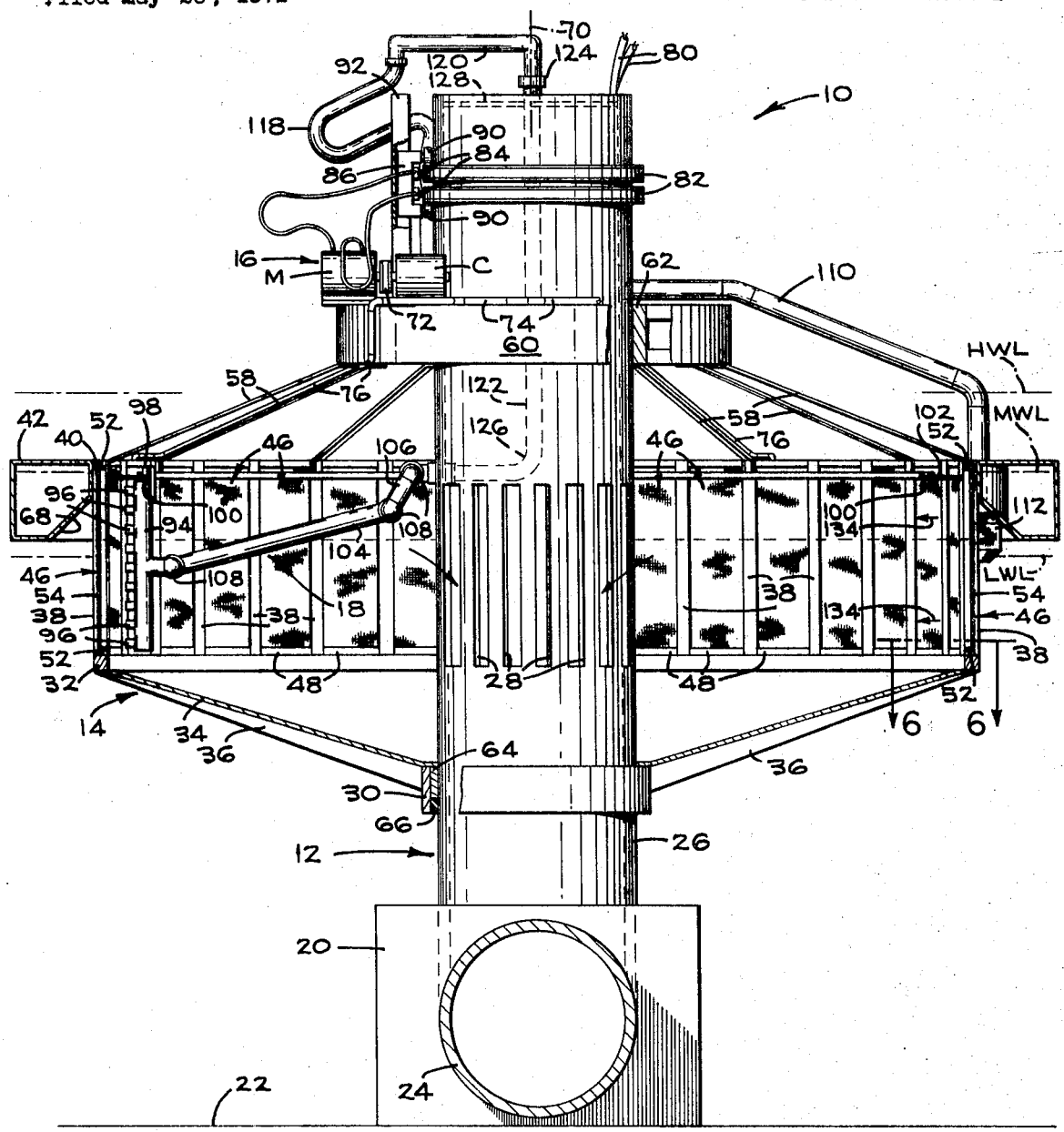
FIG. 1 is a side elevation, partially in section, of the floating water screen of the present invention.

The present invention concerns a floating water screen installation indicated generally by reference numeral 10 in FIG. 1. The installation basically comprises a stationary anchoring structure 12, a floating screen structure 14, a rotating drive 16, and a screen backwash system 18.

The stationary anchoring structure 12 includes a concrete base 20 on a bed 22 of a suitable body of water such as a river, pond, or tidal pool. In order to provide sufficient support in some situations, it may be necessary to cover a portion of the bed 22 with concrete. From the base 20, an outlet pipe 24 made of concrete pipe, is extended to the facility where the screened water is to be employed.

Extending upwardly from the base 20, is a hollow fixed central column or standpipe 26, preferably made of steel pipe. This hollow column or standpipe is in communication with the outlet pipe 24 through the base 20 and further includes closely spaced long vertical slot openings 28 in the pipe wall extending around its entire periphery.

The floating screen structure 14 (which may for example, be 60 feet across) comprises a sleeve 30 and a large diameter ring 32 joined by a frusto-conical bottom plate 34. Rigidity is increased by means of multiple radially extending reinforcing ribs 36. Multiple upstanding support posts 38 are attached to the ring 32 at their lower ends. These support posts 38 are attached at their upper ends, to an inner surface 40 of an exteriorly located annular floatation chamber 42.

Referring now to FIG. 6, it can be seen that each post 38 has a pair of slots 44. These slots extend vertically for the entire height of the posts 38 and serve to retain multiple separate screen panels 46 between adjacent posts. Thirty-six panels are used in the present embodiment and form a large regular polygon when viewed from above as in FIG. 2.

Each of the screen panels is identical in construction and is comprised of a rectangular framework 48 having side angles 50, top and bottom angles 52, and a wire cloth screen 54. The wire cloth screen preferably has openings of ¼ to ⅜ inch and is epoxy bonded to the framework as indicated at 56.

This screen construction, in cooperation with the slotted posts 38, permits removal of the screen panels 46 for repair or replacement by simply vertically sliding or lifting them out. The weight of the panels resting on the ring 32 provides a sufficient bottom seal to prevent passage of debris and the side angles 50 received in slots 44 prevent debris from passing around the panels.

Multiple braces 58 extend upwardly from the interior sides of some of the posts 38 to support a drive platform 60 that surrounds the standpipe 26. These braces do not obstruct the removal of the screen panels 46 as described above. The drive platform, of any sufficiently rigid construction, includes an upper bushing 62. The previously described sleeve 30 incorporates a lower bushing 64 and a seal 66 which prevents passage of debris between the standpipe 26 and sleeve 30 to the interior of the floating screen structure 14.

As the water level in the body of water in which the floating screen installation is employed varies, between a high water level HWL and a low water level LWL, the entire floating screen framework 14 rises and falls, sliding on the fixed central column or standpipe 26 by means of the aforementioned bushings. It is also to be understood that the floating screen framework 14 is capable of simultaneous rotary motion in response to the rotating drive 16 to be described later.

In addition to structurally tying the tops of posts 38 together, the basic purpose of the flotation chamber 42 is to buoyantly support the entire floating screen structure and any equipment mounted thereon while maintaining the tops of the screen panels at or slightly above the surface of the water. In the present embodiment, the flotation chamber 42 (FIGS. 1 and 2) is in the form of a hollow annular ring having a rectangular cross section truncated by an inclined surface 68. Such a cross section with an inclined surface 68 prevents substantial obstruction or reduction in the effective screening area adjacent the upper portions of the screen panels 46. It is to be understood that the shape of the flotation chamber 42 may be varied, divided into several water tight chambers, or filled with a foam or other buoyant material.

Other advantages of the externally located flotation chamber 42 includes the prevention of direct impingement of floating surface debris with the screen panels 46, retardation of icing of the screens in winter, and the prevention of carry-over of floating debris during rough surface conditions without enclosing the upper portion of the floating screen structure 14.

In order to rotate the floating screen structure 14 about a vertical axis 70 formed by the stationary center column or standpipe 26, the rotating drive 16 includes an electric motor M which drives an air compressor C through a V-belt drive 72. These components are mounted on the drive platform 60 and rotate with the floating screen structure 14. From the compressor, a series of manifold lines 74 supply air under pressure to four radially extending airlines 76 which pass down the braces, over the flotation chamber 42 and terminate in nozzles 78 oriented tangentially to the annular float chamber 42. These nozzles are so positioned so that they are below the surface of the water. Rotary propulsion of the floating screen structure 14 is thus achieved by the thrust reaction of the air discharged from the multiple nozzles 78.

An advantage of employing such an air jet screen propulsion system is that the sub-surface discharge of air prevents or reduces the formation of ice on the screen panels and flotation chamber when the floating water screen installation is employed in low temperature environments. Surface debris is also directed away from the immediate vicinity of the water screen framework.

In order to supply power to the electric motor M, a pair of power conduits 80 from an external power source, are passed through the upper open end of the fixed central column or standpipe 26 as shown in FIGS. 1 and 2. These power conduits then pass through the side walls of the standpipe and are connected to a pair of conductor rings 82 fixed on the upper portion of the standpipe 26. A pair of brushes 84 are secured in a holder 86 for maintaining a continuous electrical connection with the conductor rings. Flexible power lines having sufficient slack extend from the brushes 84 to the electrical motor M.

As best seen in FIG. 1, the holder further incorporates a pair of rollers indicated at 90 in engagement with the upper and lower surfaces of the conductor rings 82 and is slidably mounted in a channel post 92 secured to the rotating drive platform 60.

It will be seen that as the floating screen structure 14 is rotated about the central column 26, the channel post 92 is effective to sweep the holder and its brushes 84 around the continuous conductor rings 82. Further, upon vertical sliding motion of the floating screen framework 14 with respect to the center column 26, it can be seen that the holder is vertically retained with respect to the conductor rings 82 by the rollers 90 and that the holder 86 is free to vertically slide in the channel post 92. Continuous electrical power is therefore provided to the motor M during both rotation and a vertical rising and falling motion of the floating screen structure 14.

One of the purposes of rotating the floating screen structure 14 is to permit backwashing of the multiple screen panels 46. This is accomplished by means of the backwash system generally indicated at 18 which includes a manifold 94 having multiple jets 96 in close proximity to the inside surfaces of the screen panels 46. In order to vertically support the manifold and maintain it in vertical alignment with the screen panels rotating therepast, the manifold 94 is hung from the rotatable floating screen structure 14 by means of a roller 98 supported by a circular guide track 100 attached to the posts 38 by means of multiple brackets 102. The motion of the manifold in the horizontal plane is prevented by backwash water supply pipes 104 and 106. These pipes, however, permit motion of the manifold in a vertical plane due to multiple swivel joint connections 108 between the pipes 104, 106, and manifold 94.

Pickup of backwash water is effected outside the screened area of the floating screen structure 14 by means of a pipe 110 having a basket type strainer 112 located on its pickup end. As seen in FIG. 2, a recess 114 is provided in the flotation chamber 42 to accommodate these components. Line 110 leads to a suitable pump P, on the drive platform 60 which is driven by the electric motor M through a V-belt drive system 116. From the output side of the pump P, a flexible hose 118 extends to a swingable pipe section 120 mounted, for rotation about the vertical axis 70, to a central rigid pipe section 122 by means of a swivel joint 124. The rigid pipe section 122 extends centrally down the hollow column or standpipe 26 making a 90° bend 126 adjacent its lower end and thereafter passing through the sidewalls of the central column 26 to one of the previously described swivel joint connections 108 with backwash pipe section 106. Multiple braces 128 are employed to support the rigid pipe section 122 within the standpipe 26 adjacent its upper end.

A modified form of the rotary drive 16 of the present invention will now be described. Unchanged components will be referred to by their original reference characters and numbers. Comparing FIGS. 2 and 7, it is to be noted that the air compressor C and V-belt drive 72 of FIG. 2 have been eliminated and manifold lines 74, modified.

The purpose of the modified form is to provide a simplified water jet rotary drive which derives its power from the previously described backwash system 18. Referring now to FIG. 7, a tee 130 is inserted between the outlet of pump P and the flexible line 118. This tee 130 is connected to multiple manifold lines 132 that in turn connect to the radially extending branch lines 76, having nozzles 78.

OPERATION

The operation of the floating water screen installation will now be described with reference to FIG. 1. When the floating water screen structure 14 is at the median water level MWL, as indicated, water passes through the screen panels to the interior of the screen structure as shown by arrows 134.

Due to the large screening area produced by the multiple screen panels 46, the velocity of the water passing through the screens is very low—in the order of 1 foot per second. This has the beneficial effect of substantially reducing debris accumulation on the screens and permits fingerling sized fish to swim away from the screens. The screened water then enters the hollow central column or standpipe 26 through the long vertical slots 28 and is conducted away by means of the outlet pipe 24.

As the level of the body of water rise varies between the high water level HWL and low water level LWL, the floating screen structure 14 slides vertically on the central standpipe 26 thereby maintaining a constant submergence and effective screening area throughout the vertical operating range of the installation. The long vertical slots 28 in the central standpipe are of sufficient length such that, when the floating screen structure 14 is at the low water level LWL, flow into the standpipe is not restricted. Furthermore, the frusto-conical base plate or bottom 34 extends downwardly below the bottom of the screen panels a sufficient distance such that when the floating screen structure 14 is at the high water level HWL, the bottoms of the slots 28 in the standpipe 26 do not extend below the lower sleeve 30 to permit entrance of unscreened water to the interior of the standpipe.

As the water screen structure 14 rises and falls, the backwash manifold 94, dependently supported from this structure, also rises and falls in a vertical swinging motion. The backwash water supply pipe sections 104 are articulated for motion in a vertical plane by the multiple swingable joints 108. It is to be noted, however, that the backwash manifold 94 is stationary, with respect to horizontal rotary motion, because the pipe sections 104 and 106 resist motion in the horizontal plane. Since the manifold 94 is dependently supported from the circular track 100 extending around the interior periphery of the screen structure 14 by means of a roller, the screen structure is able to rotate relative to the backwash manifold 94.

Referring to FIG. 2, the floating water screen structure 14 is rotated in a clockwise direction by means of the previously described rotary drive system terminating in tangentially oriented nozzles 78. As the floating screen structure 14 rotates about its central axis 70, each of the individual screen panels 38 pass the manifold 94. Backwash water is ejected through the multiple nozzles 96 outwardly ejects accumulated debris from the exterior surfaces of the screen panels.

FIGS. 3, 4 and 5 illustrate several types of bodies of water in which the water screen installation of the present invention can be employed. When the floating water screen of the present invention is employed in a river having a substantial current or flow, it is desirable to place the screen installation in a natural or man-made cove such as indicated at 138. This prevents exertion of excessive pressure against the upstream portion of the screens and minimizes the possibility of damage to the screens and flotation chamber due to impact by large floating objects.

When employed in a tidal pool (FIG. 5) the floating screen installation is not subjected to the action of substantially sized waves or breaking surf.

From the foregoing description it will be apparent that the present invention is particularly well suited for application to large water screen installations with a low velocity through the screens and a large screened water output. It is pointed out, however, that the present invention may be employed with respect to a great variety of screening installations of substantially different sizes, water velocities, and screened water outputs.

Although the best mode contemplated for carrying out the present invention has been herein shown and described, it will be apparent that modifications and variations may be made without departing from what is regarded to be the subject matter of the invention.

What is claimed is:

1. Apparatus for screening large quantities of water comprising:
    a vertical post mounted in a fixed position within a body of water, said post having an internal passage communicating with an outlet pipe and having a peripheral opening in communication with said internal passage,
    a frame supporting an endless circle of screens about said post,
    means mounting said frame for vertically sliding movement on said post with said screens in radially spaced relation to said post and to said opening,
    said frame having a float secured thereto to sustain said frame in predetermined relation to the surface of the body of water with the upper edges of the screens above the said body of water, and,
    means blocking water flow beneath said screens into said post opening, whereby water is compelled to flow through said screens to said opening.

2. The apparatus of Claim 1 wherein said vertical post includes means anchoring said post on the bed of said body of water, and,
    means for rotating said screen frame in a horizontal plane about said post.

3. The apparatus of Claim 1 further including backwash means inside said screen frame for repulsing debris from outside said screen frame.

4. The apparatus of Claim 1 wherein said float comprises an annular float mounted externally of said screen and constructed and arranged at the surface of said body of water to deflect debris prior to contact thereof with said screens.

5. Apparatus for screening large quantities of water from a body of water in which the water level varies comprising:
(a) a vertical standpipe mounted in a fixed position within the body of water and extending above the maximum level of the water, said standpipe having an internal passage, a plurality of screened water inlet openings in communication with said internal passage intermediate of the top and bottom portion of said standpipe, and a screened water discharge pipe in communication with said internal passage;
(b) a debris excluding floating screen structure surrounding said vertical standpipe, said screen structure mounted to slide vertically on said standpipe in response to changes in the water level of the body of water and to rotate in a horizontal plane about said standpipe, said screen structure having a framework with a closed bottom portion and a close fitting lower sleeve around said standpipe to exclude debris from entering within the screen structure, a plurality of vertical screen panels removably supported within said framework to form a substantially continuous cylindrical screening surface concentric with said standpipe but extending radially outward therefrom, an annular floatation chamber attached to the outside of said framework adjacent the tops of said screen panels to maintain the tops of the screen panels above the level of the body of water, and a drive support platform supported by said framework at a position above the maximum level of the water, and having an upper sleeve surrounding said standpipe, said upper sleeve and said lower sleeve being vertically spaced apart sufficiently to permit unrestricted flow of screened water into said inlet openings in said standpipe regardless of the position of said screen structure to changes in the water level between the minimum and maximum levels;
(c) means mounted on said drive platform for rotating said screen structure; and
(d) water spray means mounted inside said screen structure for removing debris accumulated on the outside of said screen panels.

6. The water screen installation of Claim 5 wherein said rotating means is an air jet.

7. The water screen installation of Claim 5 wherein said rotating means is a water jet.

8. In a water screen installation for removing debris from large quantities of water received from a body of water in which the water level varies between a minimum and a maximum level, the combination comprising:
(a) a stationary free standing structure in the body of water anchored to the bed of the body of water, said structure including a vertical hollow central column extending above the maximum water level, a plurality of inlet openings spaced around the periphery of said column intermediate of the top and bottom portions of said column, said inlet openings communicating with the hollow portion of said column for admitting screened water, and an outlet conduit in communication with said hollow portion for discharging the screened water;
(b) a substantially cylindrical debris excluding floating screen structure surrounding said central column and mounted for vertical sliding motion in response to changes in the water level of the body of water and for rotation of said screen structure about said central column in a horizontal plane, said screen structure including a horizontal ring, a plurality of vertical support posts spaced around the ring, a plate enclosing the bottom of the screen structure extending downwardly from said ring to a lower sleeve mounted in close fitting relationship around said central column, a plurality of braces extending radially upward from the inner upper ends of said vertical support posts toward said central column, a drive support platform receiving the inner ends of said braces and having an upper sleeve mounted in close fitting relationship around said central column, a plurality of vertical screen panels removably supported between said vertical support posts and by said ring to form a substantially continuous cylindrical screening surface, and an annular flotation chamber attached exteriorly to the upper ends of said vertical support posts, said flotation chamber maintaining the tops of said screen panels slightly above the level of the body of water, said upper sleeve of said drive support platform and said lower sleeve of said bottom enclosing plate being vertically spaced above and below respectively said inlet openings in said central hollow column to permit the screened water passing through the screen panels to enter said inlet openings regardless of the position of the movable screen structure between the minimum and maximum water level conditions;
(c) means mounted on said drive platform for rotating said screen structure, and
(d) backwash means mounted inside said screen structure for removing debris from the outside surface of said screen panels.

9. The water screen installation of Claim 8 wherein said debris excluding floating screen structure includes a flotation chamber positioned externally to said screen panels for blocking surface debris from impinging on said panels without substantially reducing the effective screening area of said panels.

10. The water screen installation of Claim 8 wherein said backwash means includes a multi-nozzle manifold supported in close proximity to the inside surface of said rotating screen panels and maintained in vertical alignment with said vertically adjustable screen panels, a vertically articulated water feed pipe system connected to said manifold, a power driven pump mounted on said drive platform supplying water under pressure to said feed pipe system, and a supply pipe system including a swingable pipe section connecting the pump on the rotating drive platform to strainer means mounted below the water level outside of the screen panels.

11. A water screen installation for use in bodies of water in which the water level varies between a minimum and a maximum level comprising a central stationary vertical hollow support column whose top extends above the maximum water level, a screened water outlet conduit in communication with the hollow portion of said column, a debris excluding floating screen structure including a substantially cylindrical screening portion, a drive platform positioned on the upper portion of said struction above the maximum water level, and an enclosed bottom portion having sealing means around said column, said screen structure mounted in surrounding relationship to said central column for vertical sliding motion with respect to said column in response to changes in water level of the body of water and for rotation in horizontal planes about said central column, said central column further having inlet openings of sufficient size for admitting screened water at a maximum rate when said screen structure and water are at a minimum level, said enclosed bottom portion and sealing means extending below said screening portion a sufficient distance to prevent entry of unscreened water to said inlet openings of said column when said floating screen structure and water are at a maximum level, means for rotating said screen structure in horizontal planes, and a backwash manifold positioned inside said screen structure closely adjacent said screening portion for removing debris from the outer surface of said screening portion, said backwash manifold being supplied with screened water under pressure from the body of water outside of said screening portion by means of a power driven pump mounted on said drive platform and a piping system having vertically articulated and horizontally swingable sections interconnecting the body of water, the pump and the manifold.

References Cited

UNITED STATES PATENTS

| | | | |
|---|---|---|---|
| 682,994 | 9/1901 | Parsons | 210—161 |
| 367,576 | 8/1887 | Allen | 210—242 |
| 3,646,901 | 3/1972 | Budris et al. | 210—242 |
| 2,889,048 | 6/1959 | Nordin | 210—409 |
| 3,633,749 | 1/1972 | Panosh | 210—Dig 21 |
| 1,276,374 | 8/1918 | Keller | 210—154 X |
| 524,835 | 8/1894 | Oliphant | 210—409 |
| 914,758 | 3/1909 | Schumann | 210—161 X |

THEODORE A. GRANGER, Primary Examiner

U.S. Cl. X.R.

210—242, 393

UNITED STATES PATENT OFFICE
CERTIFICATE OF CORRECTION

PATENT NO. : 3,843,520
DATED : Oct. 22, 1974
INVENTOR(S) : ROBERT G. BOTTORF

It is certified that error appears in the above-identified patent and that said Letters Patent are hereby corrected as shown below:

Column 2, line 20 - change "floation" to -- flotation --.

Column 8, line 53 - change "struction" to -- structure --.

Signed and Sealed this ninth Day of December 1975

[SEAL]

Attest:

RUTH C. MASON
*Attesting Officer*

C. MARSHALL DANN
*Commissioner of Patents and Trademarks*